United States Patent
Zhang et al.

(10) Patent No.: US 9,800,580 B2
(45) Date of Patent: Oct. 24, 2017

(54) SYSTEMS AND METHODS FOR AUTHENTICATING AN ONLINE USER USING A SECURE AUTHORIZATION SERVER

(71) Applicant: MasterCard International Incorporated, Purchase, NY (US)

(72) Inventors: Jenny Qian Zhang, Wildwood, MO (US); Eric G. Alger, Edwardsville, IL (US); Steven Patrick Bucher, Lake Saint Louis, MO (US)

(73) Assignee: Mastercard International Incorporated, Purchase, NY (US)

( * ) Notice: Subject to any disclaimer, the term of this patent is extended or adjusted under 35 U.S.C. 154(b) by 37 days.

(21) Appl. No.: 14/942,575

(22) Filed: Nov. 16, 2015

(65) Prior Publication Data
US 2017/0142108 A1   May 18, 2017

(51) Int. Cl.
*H04L 29/06*        (2006.01)
*G06F 21/62*        (2013.01)

(52) U.S. Cl.
CPC ...... *H04L 63/0884* (2013.01); *H04L 63/0807* (2013.01); *H04L 63/0823* (2013.01); *H04L 63/0853* (2013.01); *H04L 63/0892* (2013.01); *G06F 21/6218* (2013.01); *H04L 63/10* (2013.01)

(58) Field of Classification Search
CPC ............. H04L 63/0884; H04L 63/0853; H04L 63/0823
USPC ......................................................... 726/7
See application file for complete search history.

(56) References Cited

U.S. PATENT DOCUMENTS

| 7,020,645 B2 | 3/2006 | Bisbee et al. |
| 7,231,661 B1 | 6/2007 | Villavicencio et al. |
| 7,657,531 B2 | 2/2010 | Bisbee et al. |
| 8,051,098 B2 | 11/2011 | Bisbee et al. |

(Continued)

FOREIGN PATENT DOCUMENTS

WO    2014109881 A1    7/2014

OTHER PUBLICATIONS

Hardt D et al: "The OAuth 2.0 Authorization Framework; rfc6749.txt", The OAuth 2.0 Authorization Framework; RFC6749.TXT, Internet Engineering Task Force, IETF; Standard, Internet Society (ISOC) 4, Rue Des Falaises CH-1205 Geneva, Switzerland, Oct. 13, 2012 (Oct. 13, 2012), pp. 1-76, XP015086448, [retrieved on Oct. 13, 2012].

(Continued)

*Primary Examiner* — Mahfuzur Rahman
(74) *Attorney, Agent, or Firm* — Armstrong Teasdale LLP

(57) ABSTRACT

A secure authorization server computer system for verifying an identity of an end-user is provided. The computer system is programmed to receive, from a computing client, an authentication request at an authorization component. The authentication request includes a secure authentication request identifier. The computer system is also programmed to validate the authentication request at the authorization component by validating the secure authentication request identifier. The computer system is further programmed to transmit an authentication response from the authorization component to the computing client. The authentication response includes an authorization code. The authorization code represents a validation of the authentication request.

21 Claims, 9 Drawing Sheets

(56) References Cited

U.S. PATENT DOCUMENTS

| | | | |
|---|---|---|---|
| 8,713,589 | B2 | 4/2014 | Menezes et al. |
| 9,112,861 | B2 | 8/2015 | Menezes et al. |
| 2008/0052091 | A1 | 2/2008 | Vawter |
| 2008/0154770 | A1* | 6/2008 | Rutherford ............ G06Q 20/04 705/44 |
| 2011/0173684 | A1* | 7/2011 | Hurry .................... G06F 21/33 726/6 |
| 2013/0282582 | A1 | 10/2013 | Pereira et al. |
| 2014/0075513 | A1 | 3/2014 | Trammel et al. |
| 2014/0189808 | A1 | 7/2014 | Mahaffey et al. |
| 2014/0229388 | A1 | 8/2014 | Pereira et al. |
| 2014/0289831 | A1 | 9/2014 | Prakash et al. |
| 2014/0297538 | A1 | 10/2014 | Pereira |
| 2014/0304162 | A1 | 10/2014 | Pereira |
| 2015/0150109 | A1 | 5/2015 | Bocanegra et al. |
| 2015/0220925 | A1 | 8/2015 | Brickell et al. |

OTHER PUBLICATIONS

Jones Microsoft B Campbell Ping Identity C Mortimore Salesforce M: "JSON Web Token (JWT) Profile for OAuth 2.0 Client Authentication and Authorization Grants; RFC7523.txt", JSON Web Token (JWT) Profile for OAuth 2.0 Client Authentication and Authorization Grants; RFC7523.txt, Internet Engineering Task Force, IETF; Standard, Internet Society (ISOC) 4, Rue Des Falaises CH-1205 Geneva, Switzerland, May 20, 2015 (May 20, 2015), pp. 1-12, XP015106172, [Retrieved on May 20, 2015].

PCT International Search Report and Written Opinion, Application No. PCT/US2016/057578, dated Dec. 15, 2016, 14 pps.

* cited by examiner

SYSTEMS AND METHODS FOR AUTHENTICATING AN ONLINE USER USING A SECURE AUTHORIZATION SERVER

BACKGROUND OF THE DISCLOSURE

This disclosure relates generally to authenticating an online end-user and, more particularly, to network-based systems and methods for using a secure authorization server to securely authenticate an identity of an end-user as well as provide end-user information to another online computing client service being accessed by the end-user.

Standards currently exist that define how an entity, such as a website or application (known as "computing clients"), can authenticate an identity of an end-user based on an authentication performed by a third-party secure authorization server, as well as to obtain end-user information, such as basic profile information. This is commonly used as a way for an Internet user to log into a third-party website using, for example, a social media website (e.g., Facebook or Twitter) login information (e.g., username and password) without exposing the login information to the third-party website. At least one known standard in use today is the OpenID Connect protocol operating on top of the OAuth 2.0 protocol.

Unfortunately, these known systems have certain limitations, including certain security concerns. In addition, some of these known protocols lack many security requirements. As a result, there have been numerous security incidents and vulnerability attacks in recent years involving these known systems.

BRIEF DESCRIPTION OF THE DISCLOSURE

In one aspect, a secure authorization server computer system for verifying an identity of an end-user is provided. The computer system is programmed to receive, from a computing client, an authentication request at an authorization component. The authentication request includes a secure authentication request identifier. The computer system is also programmed to validate the authentication request at the authorization component by validating the authentication request identifier. The computer system is further programmed to transmit an authentication response from the authorization component to the computing client. The authentication response includes an authorization code. The authorization code represents a validation of the authentication request.

In another aspect, a method for verifying an identity of an end-user is provided. The method includes receiving, from a computing client, an authentication request at an authorization component. The authentication request includes a secure authentication request identifier. The method also includes validating the authentication request at the authorization component by validating the authentication request identifier. The method further includes transmitting an authentication response from the authorization component to the computing client. The authentication response includes an authorization code. The authorization code represents a validation of the authentication request.

In yet another aspect, a computer-readable media having computer-executable instructions embodied thereon for verifying an identity of an end-user is provided. When executed by at least one processor, the computer-executable instructions cause the processor to receive, from a computing client, an authentication request at an authorization component. The authentication request includes a secure authentication request identifier. The computer-executable instructions also cause the processor to validate the authentication request at the authorization component by validating the authentication request identifier. The computer-executable instructions further cause the processor to transmit an authentication response from the authorization component to the computing client. The authentication response includes an authorization code. The authorization code represents a validation of the authentication request.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

FIG. 1 is a schematic diagram illustrating an authorization component of a secure authorization server in accordance with one embodiment of the present disclosure.

FIG. 2 is a schematic diagram illustrating a token component of the secure authorization server shown in FIG. 1.

FIG. 3 is a schematic diagram illustrating a user information component of the secure authorization server shown in FIG. 1.

FIG. 4 is a schematic diagram illustrating that secure authorization server, including authorization component, token component, and user information component, shown in FIGS. 1-3.

FIG. 5 illustrates an example configuration of a server system such as the secure authorization server shown in FIGS. 1-4.

FIG. 6 illustrates an example configuration of a computing client system such as the one shown in FIGS. 1-4.

FIG. 7 is a flowchart of an example method for enabling authentication of an end-user using the secure authorization server shown in FIG. 1.

FIG. 8 is a flowchart of an example method for requesting and receiving tokens using the secure authorization server shown in FIG. 2.

FIG. 9 is a flowchart of an example method for obtaining end-user attributes of the end-user using the secure authorization server shown in FIG. 3.

DETAILED DESCRIPTION OF THE DISCLOSURE

Figure 1:
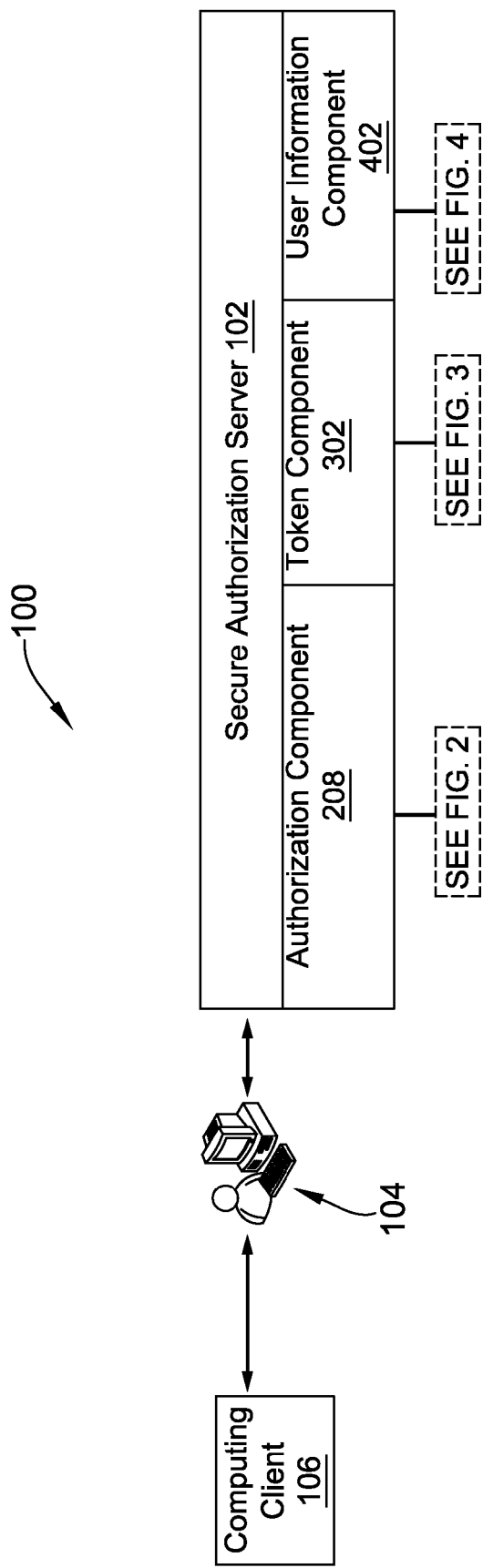
FIGS. 1-9 show example embodiments of the methods and systems described herein.

The system and method described herein includes a secure authorization server with enhanced security functionality (referred to herein as the "secure authorization server") that provides a more secure authentication process as compared to other known systems. More specifically, the secure authorization server enables computing clients (e.g., websites or computer applications) to more securely authenticate an identity of an end-user as well as provide profile information about the end-user to the computing clients for use by the computing clients. As described further below, the enhanced security functionality includes use and validation of an authorization code, an identification token, and an access token.

In the example embodiment, the secure authorization server includes at least three components (also known as "endpoints"): an authorization component, a token component, and a user information component. Each component validates a different request from a computing client. The computing client directs an authentication request to the authorization component to request that the end-user be authenticated by the authorization component. The authentication request includes at least an authentication request identifier, a scope value in which computing client lists end-user information requested from the secure authorization server, and a redirection uniform resource identifier (also known as a "redirect URI"). The redirect URI determines where the secure authorization server transmits responses to the requests from the computing client. The authorization component authenticates the end-user, including verifying the authentication request identifier, and transmits an authorization code to the computing client.

In order to assure authorization code integrity when the authorization component issues the authorization code to the computing client, the authorization component improves over other known systems by implementing standards that require that the authorization code use a web token (e.g., JavaScript Object Notation (JSON) web token or "JWT") and a signature (e.g., JavaScript Object Notation (JSON) web signature). The authorization code includes certain information (known as "JSON Web token claims" or "JWT claims") such as an entity identifier for an entity that issued the JWT, an entity identifier for an entity that is a subject of the JWT, an identifier for a recipient of the JWT, a time the JWT was issued, and the authentication request identifier from the authentication request. The authorization code further includes JSON Object Signing and Encryption (JOSE) header parameters, and conforms to a defined format such that the authorization code can be parsed into three strings, as described below.

The computing client validates the authorization code, which includes separating the authorization code into three strings, decoding each string, and using the header parameters to validate the signature.

The computing client exchanges the authorization code for an identification token and an access token by transmitting a token request to the token component of the secure authorization server. The token component validates the token request by verifying that the authorization code is valid and that the redirection URI included in the token request is identical to the redirection URI that was included in the authentication request.

If the token request validation is successful, the token component transmits an identification token and an access token to the computing client. The identification token is a security token that includes information about the authentication of the end-user and potentially other requested information.

In order to assure identification token integrity when the token component issues the identification token to the computing client, the token component improves over other known systems by implementing standards that require that the identification token use a web token (e.g., JavaScript Object Notation (JSON) web token or "JWT") and a signature (e.g., JavaScript Object Notation (JSON) web signature). The identification token also includes certain information (known as "JSON Web token claims" or "JWT claims") such as an entity identifier for an entity that issued the JWT, an unique end-user identifier, an expiration time for the identification token, a time the JWT was issued, an identifier for an entity to which the identification token was issued, the authentication request identifier from the authentication request, a string value used to associate a computing client session with an identification token, a string specifying an authentication context class reference value that identifies an authentication context class that the authentication performed satisfied, an array of strings that are identifiers for authentication methods used in the authentication, and other predefined public and private JWT claims. The identification token further includes JSON Object Signing and Encryption (JOSE) header parameters and conforms to a defined format such that the identification token can be parsed into three strings, as described below. The authentication context class reference value and the array of strings have meanings that are predefined between the computing client and the secure authorization server.

The computing client validates the identification token by separating the identification token into at least three strings, decoding each string, and using the header parameters to validate the signature.

The computing client transmits a user information request, which includes the access token, to the user information component of the secure authorization server. The user information component transmits requested end-user data (e.g., end-user information or end-user attributes) to the computing client. In some embodiments, end-user data may include name, picture, email, gender, birthdate, and other user-related data. In some embodiments, the user information can be requested to be returned from the user information component or in the identification token.

An example implementation of the authorization server computer system with enhanced security functionality may include a cardholder (i.e., end-user), a travel website (i.e., computing client), and a secure authorization server. The cardholder accesses the travel website using a computing device and begins shopping on the travel website. The cardholder wishes to prepopulate the travel website with travel preferences previously provided to the secure authorization server. Using the secure authorization system described herein, the travel website redirects the cardholder via the computing device to authenticate with the secure authorization server. The secure authorization server authenticates the cardholder and receives consent to provide travel profile information to the travel website. The secure authorization server redirects the cardholder back to the travel website with some secure tokens. The travel website directly connects to the secure authorization server and, using the secure tokens, requests desired user information directly from the secure authorization server. The travel website uses the user information to prepopulate the travel website with the travel preferences of the cardholder. This would occur behind the scenes. When the cardholder initiates and performs a purchase on the travel website, the cardholder will see that the travel website has taken into account all of the travel preferences that were previously stored on the secure authorization server.

FIG. 1 is a schematic diagram illustrating a data flow 100 between a secure authorization server 102, an end-user 104, and a computing client 106. In the example embodiment, secure authorization server 102 includes authorization component 208, token component 302, and user information component 402. End-user 104 is an individual using a computing device, connected to the internet, with at least one processor and an user interface, such as a web browser, capable of receiving input from the individual (e.g., from a keyboard, a pointing device, a mouse, or a touch sensitive panel) and displaying information to the individual from a display. Computing client 106 may include a website or a computer application.

Figure 2:
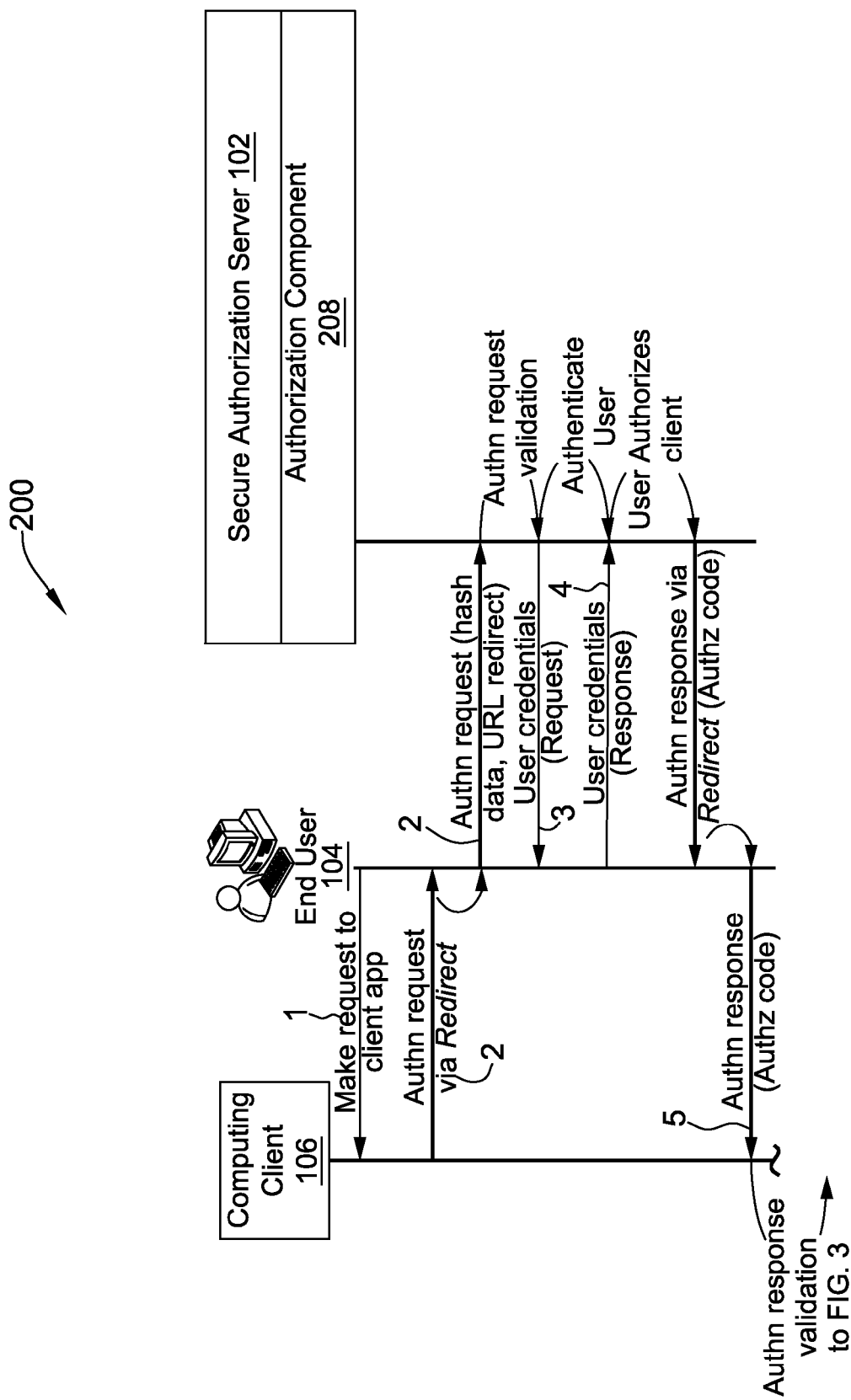

FIG. 2 is a schematic diagram illustrating a data flow 200 between the secure authorization server 102 and the computing client 106. In the example embodiment, secure authorization server 102 includes an authorization component 208. In operation, end-user 104 inputs a login request (1) to computing client 106. Computing client 106 transmits an authentication request (2), including at least the authentication request identifier and a URI redirect, to authorization component 208 to authenticate end-user 104. The URI redirect is an URI where the secure authorization server transmits a response to the authentication request.

Authorization component 208 transmits to end-user 104 a request (3) for login credentials, such as a password or other means for authenticating end-user 104. In some embodiments, end-user 104 is requested by authorization component 208 to give computing client 106 access to particular end-user information, such as email address and basic account information. End-user 104 transmits a response (4), which includes the login credentials, to authorization component 208. Authorization component 208 also verifies the authentication request identifier included in the authentication request.

Authorization component 208 transmits an authentication response (5) via the URI redirect to computing client 106 regarding whether end-user 104 is authenticated. If end-user 104 is authenticated, authorization component 208 provides computing client 106 with an authorization code, which at least includes the authentication request identifier included in the authentication request. Computing client 106 validates the authorization code before transmitting a token request, described below.

Secure authorization server 102 may include any number of end-users 102, computing clients 104, and authorization components 106.

Figure 3:
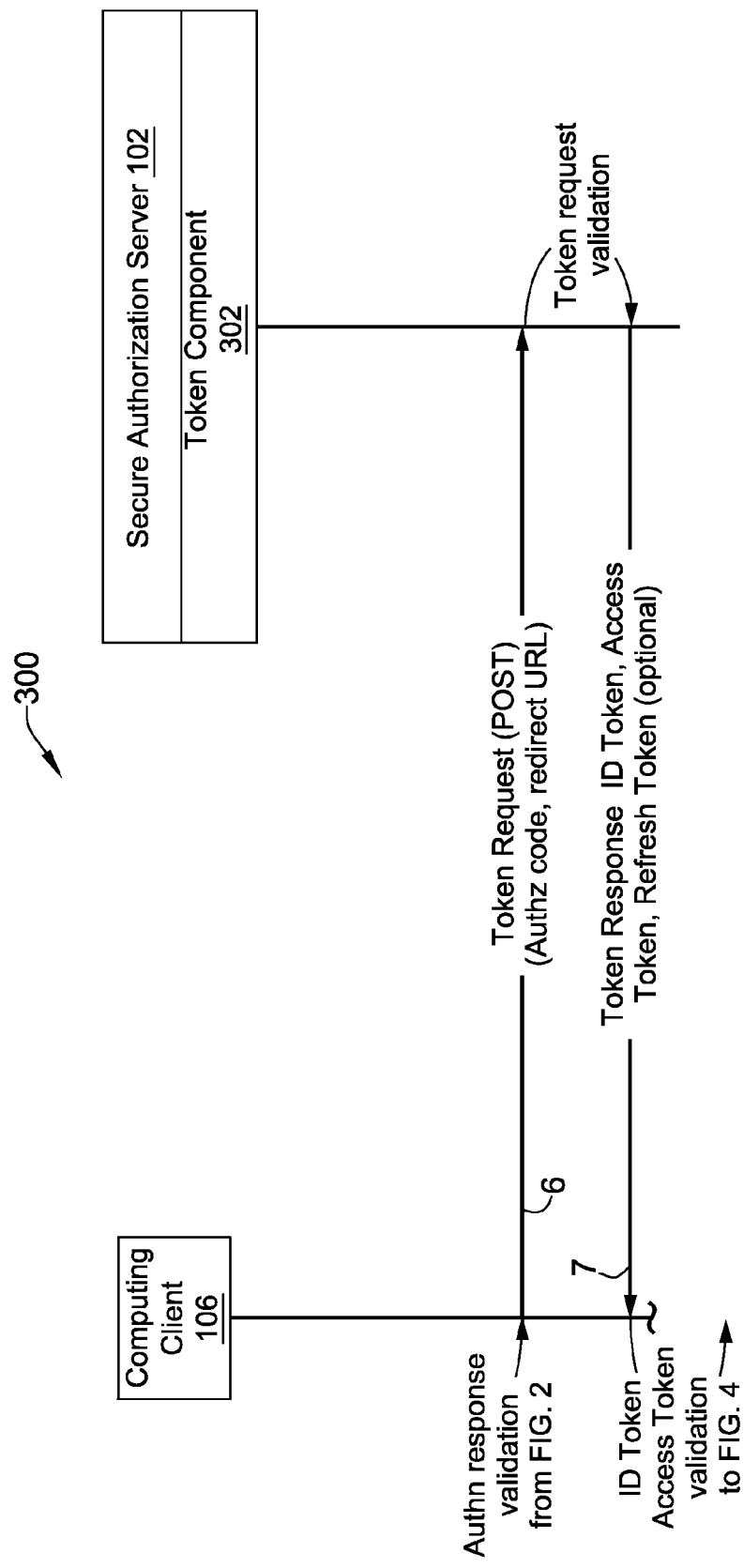

FIG. 3 is a schematic diagram illustrating a data flow 300 between the secure authorization server 102 and the computing client 106. In the example embodiment, secure authorization server 102 also includes a token component 302. In further operation, computing client 106 transmits a token request (6), including the authorization code and the URI redirect, to the token component 302.

Token component 302 validates the token request and transmits a response (7), including an identification token and an access token, to computing client 106. The identification token at least includes the authentication request identifier included in the authentication request. Computing client 106 validates the identification token before transmitting a user information request, described below.

Secure authorization server 102 may include any number of end-users 102, computing clients 104, and token component 302.

Figure 4:
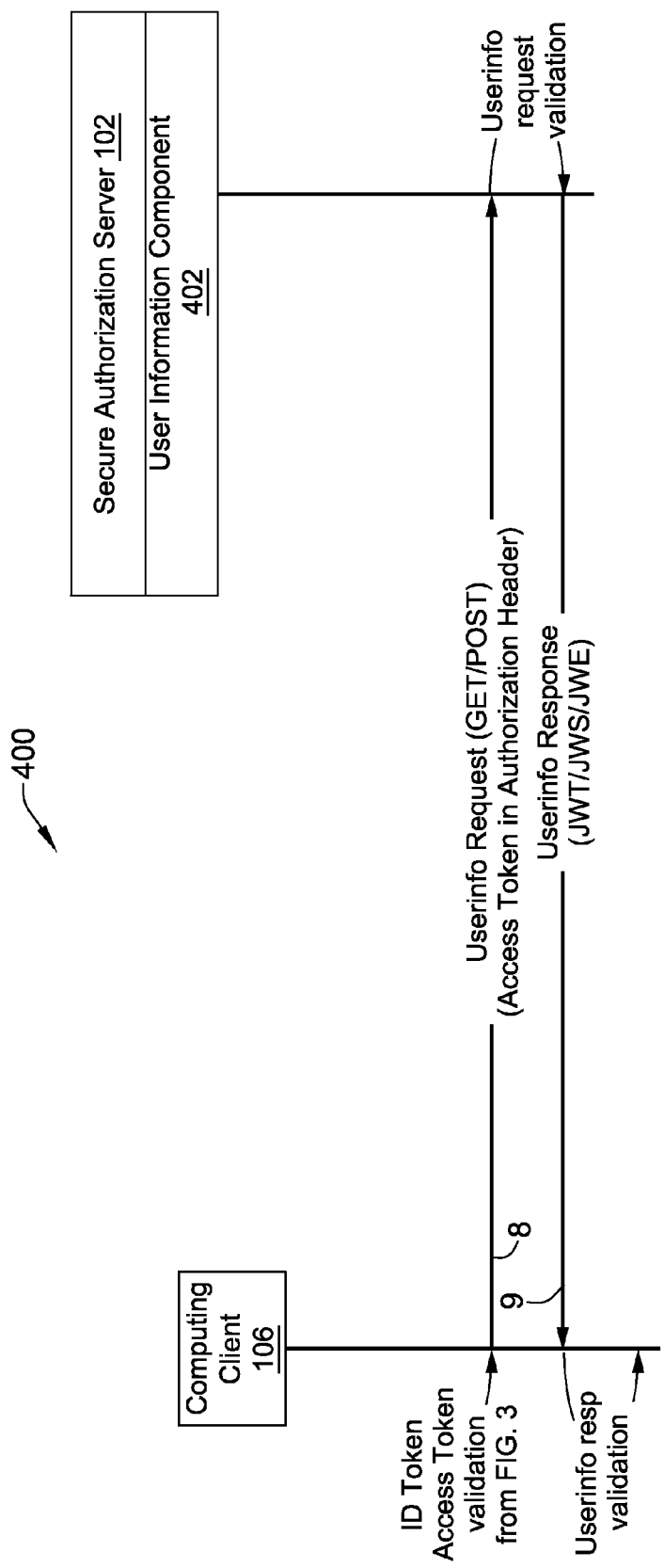

FIG. 4 is a schematic diagram illustrating a data flow 400 between secure authorization server 102 and computing client 106. In the example embodiment, secure authorization server 102 includes a user information component 402. In still further operation, computing client 106 transmits a user information request (8), including the access token, to user information component 402.

User information component 402 validates the user information request and transmits requested end-user 104 information (9) (e.g., user name, picture, email, gender and birthdate) to computing client 106.

Secure authorization server 102 may include any number of end-users 102, computing clients 104, and user information components 306.

Figure 5:
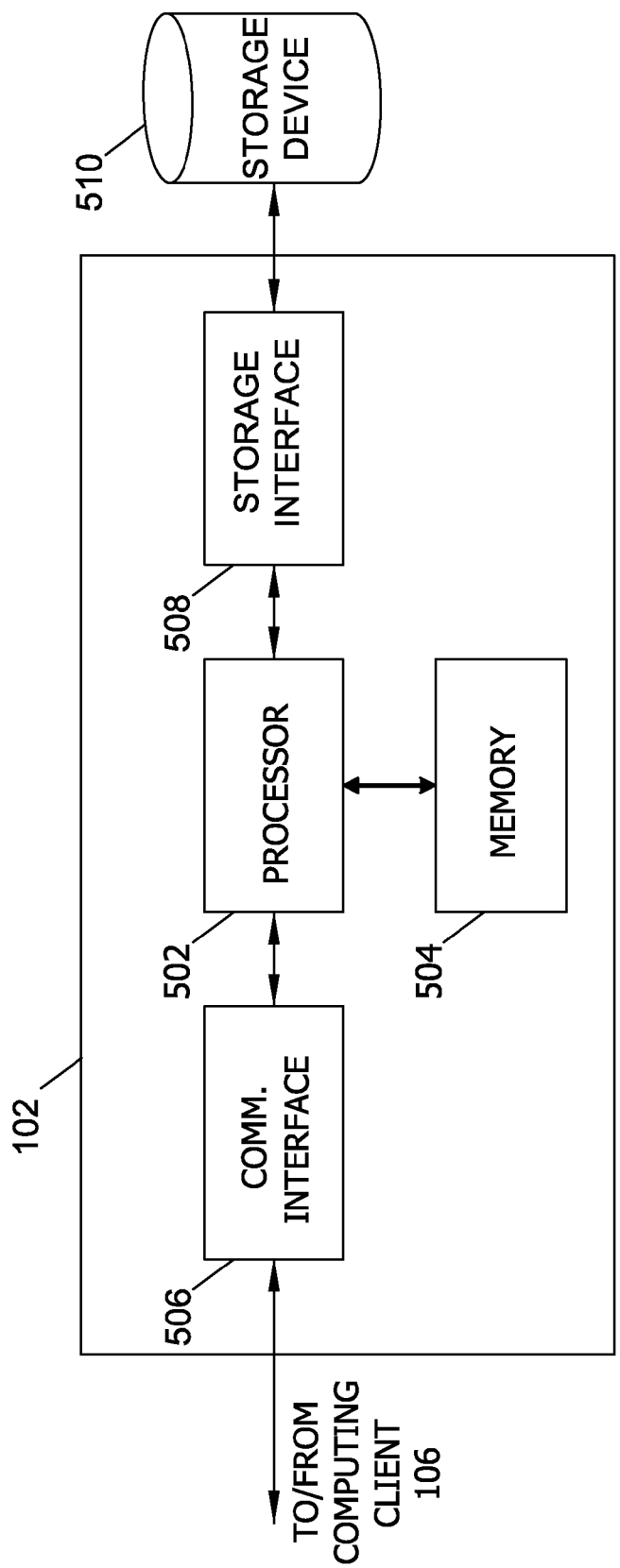

FIG. 5 illustrates an example configuration of secure authorization server 102, also shown in FIGS. 1-4, in accordance with one example embodiment of the present disclosure. In the example embodiment, secure authorization server 102 processes the authentication request, the token request, and the user information request transmitted to authorization component 208, token component 302, and user information component 402, respectively. Secure authorization server 102 may include additional, fewer, or alternate components, including those discussed elsewhere herein.

Secure authorization server 102 includes a processor 502 for executing instructions. Instructions may be stored in a memory area 504, for example. Processor 502 may include one or more processing units (e.g., in a multi-core configuration) for executing instructions. The instructions may be executed within a variety of different operating systems on the secure authorization server 102, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 502 is operatively coupled to a communication interface 506 such that secure authorization server 102 is capable of communicating with a remote device such as a computing client system or another secure authorization server 102. For example, communication interface 506 may receive requests from computing client 106 via the Internet.

Processor 502 may also be operatively coupled, via a storage interface 508, to a storage device 510. Storage device 508 is any computer-operated hardware suitable for storing and/or retrieving data. In some embodiments, storage device 510 is integrated in secure authorization server 102. For example, secure authorization server 102 may include one or more hard disk drives as storage device 510. In other embodiments, storage device 510 is external to secure authorization server 102 and may be accessed by a plurality of server systems 500. For example, storage device 510 may include multiple storage units such as hard disks or solid state disks in a redundant array of inexpensive disks (RAID) configuration. Storage device 510 may include a storage area network (SAN) and/or a network attached storage (NAS) system.

Storage interface 510 is any component capable of providing processor 502 with access to storage device 510. Storage interface 510 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 502 with access to storage device 510.

Memory area 504 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program. In one embodiment, secure authorization server 102 also includes a database server (not shown).

Figure 6:
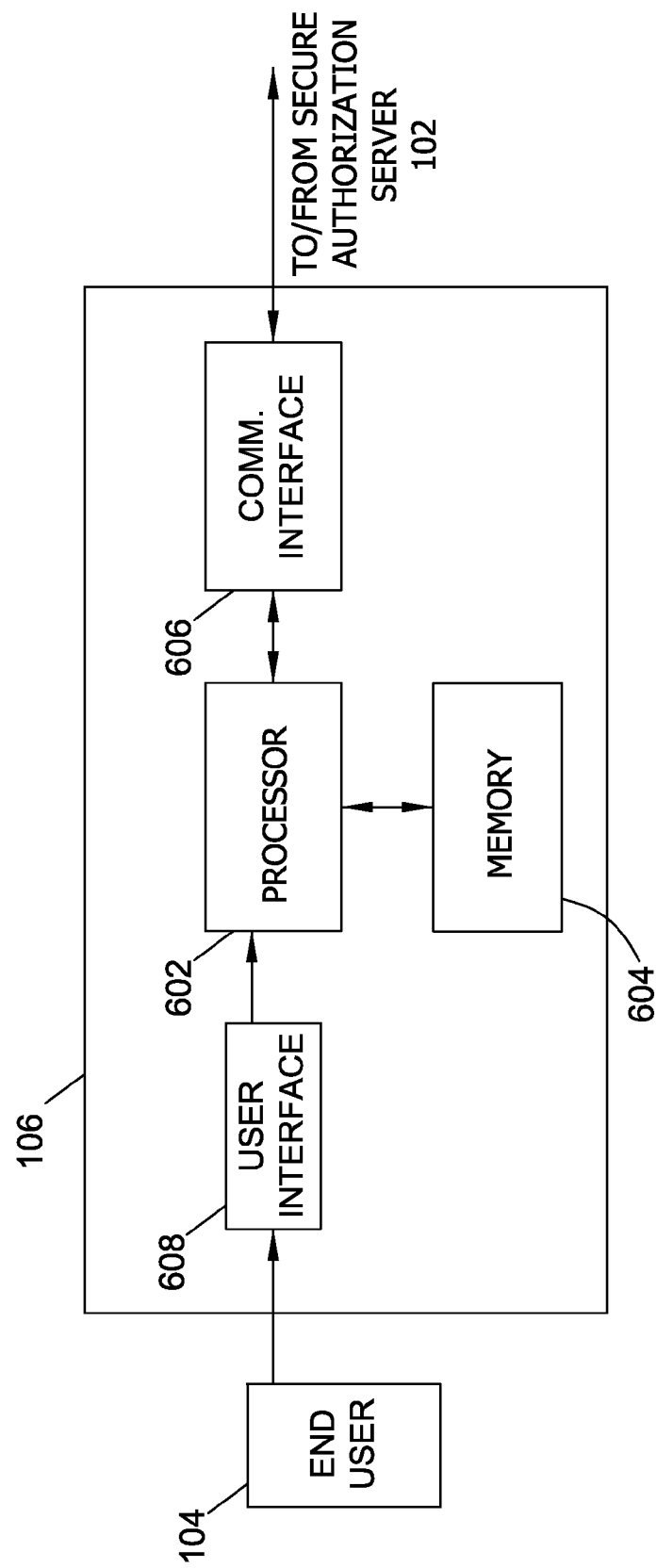

FIG. 6 illustrates an example configuration of computing client 106, as shown in FIGS. 1-4. Computing client 106 transmits the authentication request, the token request, and the user information request to secure authorization server 102, as well as validates responses from secure authorization server 102. Computing client 106 may include additional, fewer, or alternate components, including those discussed elsewhere herein.

Computing client 106 includes a processor 602 for executing instructions. In some embodiments, executable instructions are stored in a memory area 604. Processor 602 may include one or more processing units (e.g., in a multi-core configuration). Memory area 604 is any device allowing information such as executable instructions and/or other data to be stored and retrieved. Memory area 604 may include one or more computer-readable media.

Computing client 106 includes a communication interface 606, which is in communication with secure authorization server 102, for communicating between computing client 106 and secure authorization server 102. Communication interface 606 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)). Communication interface 612 may also include, for example, a local area network (LAN) or a wide area network (WAN), dial-in-connections, cable modems, special high-speed Integrated Services Digital Network (ISDN) lines, and RDT networks.

Stored in memory area 604 are, for example, computer-readable instructions for providing a user interface 608 to end-user 104. User interface 608 is used to display information to and receive input from end-user 104 via a user device connected to the Internet. The user device may be any device capable of interconnecting to the Internet including a smartphone or personal computer device. User interface 608 may include, among other possibilities, a web browser or computing client application interconnected to the Internet through a network, such as a local area network (LAN) or a wide area network (WAN), dial-in-connections, cable modems, special high-speed Integrated Services Digital Network (ISDN) lines, and RDT networks. The user interface 608 displays information to end-user 104 and enables end-user 104 to interact with media and other information typically embedded on a web page or a website. In the example embodiment, end-user 104 initiates a login request to computing client 106 via user interface 608 (e.g., using the computing client website or application), whereupon processor 602 redirects end-user 104 (e.g., by redirecting the end-user web browser) to authorization component 208 for authentication, also shown in FIG. 1.

Further stored in memory area 604 are computer-readable instructions for transmitting, via communication interface 606, the authentication request, the token request, and the user information request to secure authorization server 102. Further still stored in memory area 604 are computer-readable instructions for receiving, via communication interface 606, and validating the authentication response, the token response, and the user information response from secure authorization server 102.

Figure 7:
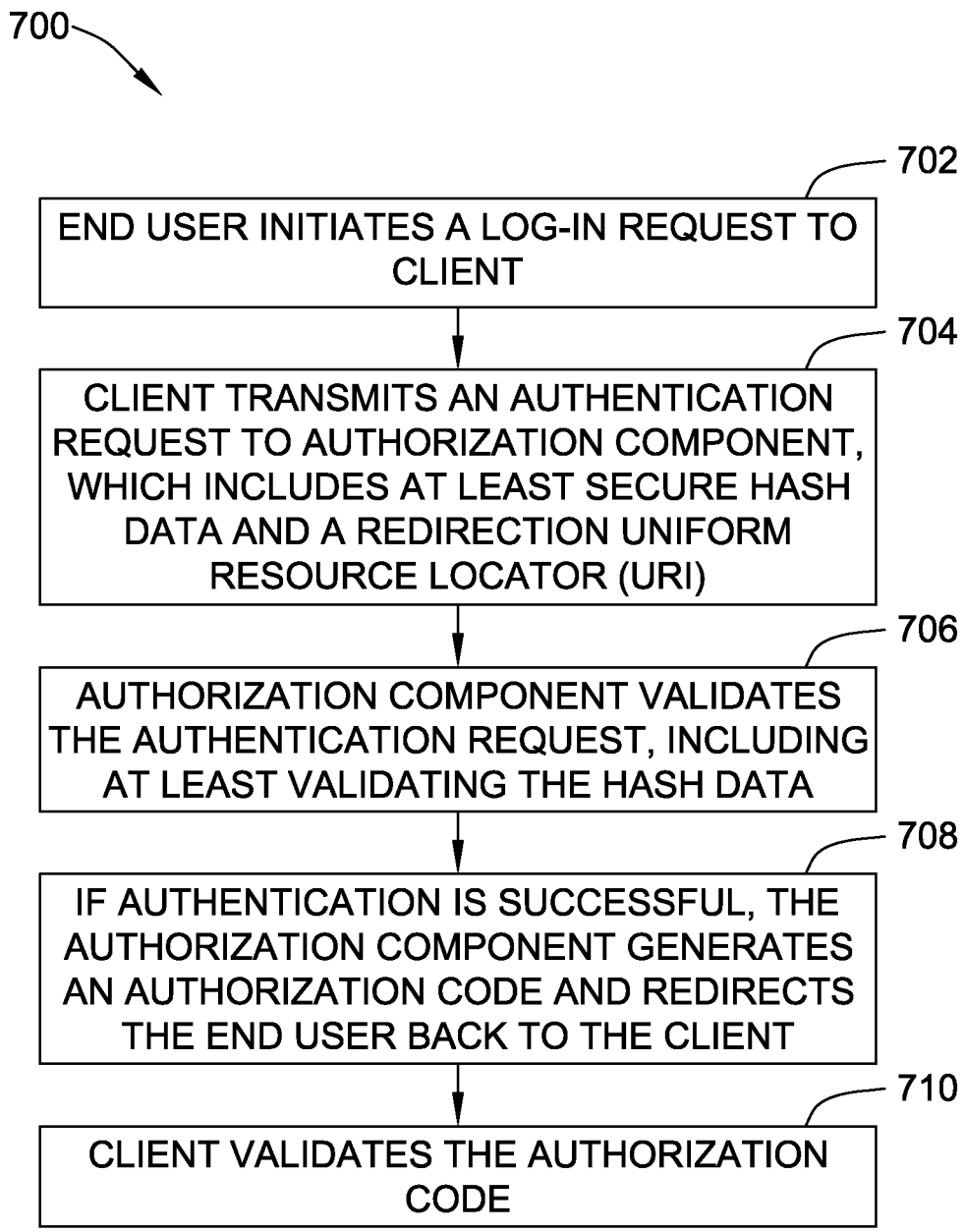

FIG. 7 is a flowchart of a method 700 for enabling authentication of end-user 104 in accordance with an embodiment of the disclosure. As shown in steps 702 through 710, authorization component 208 authenticates end-user 104 via computing client 106 and transmits an authentication response.

At 702, end-user 104 initiates a login request to computing client 106 (e.g., using the computing client website or application). At 704, computing client 106 transmits an authentication request to authorization component 208 and redirects the end-user 104 (e.g., by redirecting the end-user web browser) to the authorization component 208 to authenticate. The authentication request includes at least the authentication request identifier, a scope value in which computing client 106 lists the end-user information requested from the secure authorization server 102, a URI redirect to which authorization component 208 will transmit an authentication response back once authentication is granted, and an opaque state value used to maintain state between a request and a response. In some embodiments, the authentication request further includes one or more of a response type code for an authorization code flow, a computing client identifier for uniquely identifying a computing client application, and a nonce string value used to associate a computing client session with an identification token.

The authentication request identifier is based upon at least the scope value, the computing client identifier, the response type, the URI redirect, the opaque state value, and the nonce string value. In the example embodiment, the authentication request identifier is Base64 encoded and may include: (SHA256 Hashing (scope value+response type+computing client identifier+URI redirect+state value+nonce string value))=48-Char string.

As shown at 706, authorization component 208 validates the authentication request by at least validating the authentication request identifier. In some embodiments, authorization component 208 verifies one or more of the scope value, the response type, the computing client identifier, the state value, and the nonce string value, included in the authentication request.

Authorization component 208 transmits to end-user 104 a request for login credentials, such as a password or other means for authenticating end-user 104. In some embodiments, end-user 104 is requested to allow computing client 106 access to particular end-user information, such as email address and basic account information, which was requested by computing client 105 using the scope value. End-user 104 transmits a response, which includes the login credentials, to authorization component 208, which is validated by authorization component 208.

As shown at 708, if the authentication is successful, the authorization component 208 transmits the end-user 104 back to the computing client 106 with an authentication response, via the URI redirect provided in the authentication request. The authentication response includes at least an authorization code and the state value received in the authentication request. In the example embodiment, the authorization code is delivered to computing client 106 by adding the authorization code and the state value to a query component of the redirect URI using an "application/x-www-form-urlencoded" format in the HTTP request entity body.

In order to assure authorization code integrity when authorization component 208 issues the authorization code to computing client 106 in the authentication response, the authentication response is implemented according to JSON Web token ("JWT") and JSON Web Signature ("JWS") standards, where the JWT is signed by authorization component 208 and verified by computing client 106. The authorization code includes information on an entity that issued the JWT, an entity that is a subject of the JWT (e.g., end-user 104), intended recipients of the JWT, a time at which the JWT was issued, and the authentication request identifier from the authentication request.

If the authentication request validation is not successful, the authorization component 208 transmits an error response to computing client 106.

In the example embodiment, the authorization code includes a JOSE header with an algorithm parameter set to ES256 or higher, a header parameter that contains a base64url encoded SHA-256 thumbprint (a.k.a. digest) of the DER encoding of the X.509 certificate corresponding to the key used to digitally sign the authorization code, and a JOSE header type, where "JOSE" is used for JWE compact serialization and "JOSE+JSON" is used for JWS/JWE JSON serialization.

The authorization code is implemented according to JSON (JWS) signature and JSON object (JWT) signing standards. The authorization code is encoded using Base64 encoding and formatted such that the authorization code can be parsed into at least three strings, wherein each string can be decoded by computing client 106 during validation. In the example embodiment, the authorization code is Base64 encoded and may include: Base64Encoded(JWS JOSE header).Base64Encoded(JWT).Base64Encoded(JWS Signature).

As shown at 710, computing client 106 validates the authorization code by separating the authorization code, where delimited by ".", into three strings, where str1=Base64Encoded(JWS JOSE header), str2=Base64Encoded(JWT), and str3=Base64Encoded(JWS Signature). Each string can be decoded by computing client 106 using Base64 decoding, where Base64Decoded str1=JWS JOSE header, Base64Decoded str2=JWT, and Base64Decoded str3=JWS Signature. In some embodiments, where a signing certificate is stored locally by computing client 106, computing client 106 can use the signing certificate identified by the JWS JOSE header SHA-256 thumbprint to validate the JWS signature using the algorithm parameter.

Figure 8:
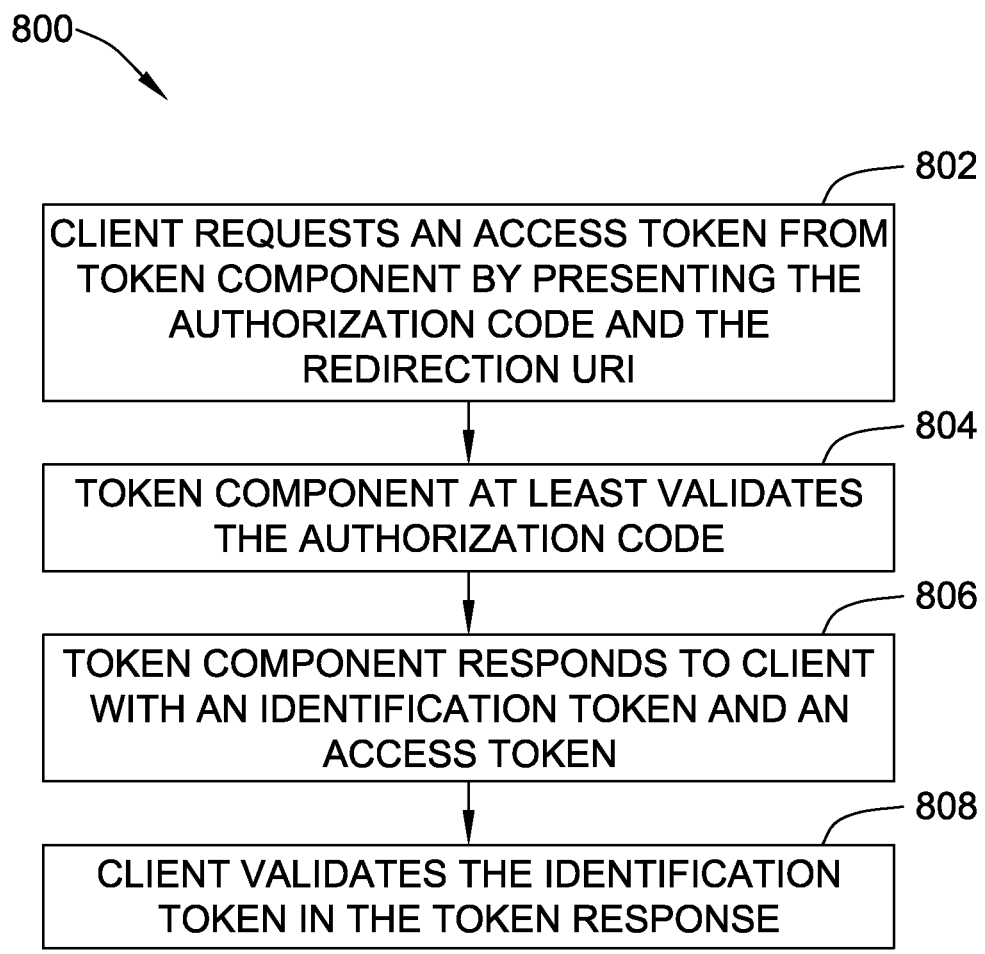

FIG. 8 is a flowchart of a method 800 for requesting and receiving tokens in accordance with an embodiment of the disclosure. As shown in steps 802 through 808, token component 302 validates a token request from computing client 106 and transmits a token response, which at least includes an identification token and an access token.

At 802, computing client 106 transmits a token request to the token component 302 by presenting the authorization code from the authentication response and the URI redirect.

At 804, token component 302 validates the token request by at least validating the authorization code and verifying that the URI redirect in the token request is identical to the URI redirect included in the authorization request. If validation is successful, token component 302 transmits to computing client 106 a token response, including an identification token and an access token, as shown at 806. The identification token at least includes the authentication request identifier from the authentication request. In some embodiments, the token response further includes an identification token value associated with an authenticated session, an access token value, and a lifetime (in seconds) of the access token. Alternate embodiments may also include a refresh token used to obtain new access tokens.

If the token request validation is not successful, token component 302 transmits an error response to computing client 106.

The identification token is a security token that includes JWT claims (e.g., identity information) about the end-user 104, and potentially other requested information, as described. In order to assure identification token integrity when token component 302 issues the identification token to computing client 106, the identification token is implemented according to JSON Web token (JWT) and JSON Web Signature (JWS) standards, and the identification token is signed by token component 302 and verified by computing client 106.

In the example embodiment, the identification token includes one or more of the following JWT claims: an issuer identifier value for an issuer of the token response, a unique end-user identifier not exceeding 255 ASCII characters in length, a computing client identifier for computing client 106 (known as an "audience value"), an expiration time on or after which the identification token cannot be accepted for processing, a time that the identification token was issued, the authentication request identifier from the authentication request, and a JWT string specifying an authentication context class reference value that identifies an authentication context class performed by the authentication. In some embodiments, there is more than one audience and audience value.

In the example embodiment, the identification token also includes the JWT nonce string value passed from the authentication request to the identification token. Computing client 106 verifies that the nonce string value in the identification token is equal to the value of the nonce string value transmitted in the authentication request. The nonce string value is used to associate a computing client session with an identification token, which mitigate malicious or fraudulent attempts to repeat valid data transmissions.

In the example embodiment, if the nonce string value was included in the authentication request, the nonce string value is also present in the identification token. Computing client 106 should verify that the nonce string value in the identification token is the same nonce string value transmitted in the authentication request. Computing client 106 should check the nonce value for replay attacks. The precise method for detecting replay attacks is client specific.

In some embodiments, the identification token further includes a JWT and JSON array of strings that are identifiers for authentication methods used in the authentication. For example, the array may indicate that both password and one time password (OTP) authentication methods were used.

In further embodiments, the identification token includes a string identifying an entity to which the identification token was issued (known as an "authorized party"). If the authorized party is present in the identification token, the identification token also contains the computing client identifier of the authorized party.

In the example embodiment, the identification token includes one or more JWT public claims, such as first name, middle name, family name, email, phone number, preferred username, and locale.

In the example embodiment, the identification token includes one or more JWT private claims. The one or more JWT private claims are custom user attributes that may be included in the identification token returned by the token component. In some embodiments, the private claims may be, but not limited to, one or more of the following: roles, user name, tenant identification, site identification, application proprietary identification, and a user identifier of a logged-in customer service representative.

In the example embodiment, the identification token includes a JOSE header with an algorithm parameter set to ES256 or higher, a header Parameter that contains a base64url encoded SHA-256 thumbprint (a.k.a. digest) of the DER encoding of the X.509 certificate corresponding to the key used to digitally sign the authorization code, and a JOSE header type, where "JOSE" is used for JWE compact serialization and "JOSE+JSON" is used for JWS/JWE JSON serialization.

The identification token is implemented according to JWS Signature and JSON object (JWT) signing standards. The identification token is a Base64 encoded JSON object and formatted so that the identification token can be parsed into at least three strings, wherein each string can be decoded by computing client 106 during identification token validation. In one embodiment, the identification token is formatted as Base64Encoded(JWS JOSE header).Base64Encoded(JWT).Base64Encoded(JWS Signature).

At 808, computing client 106 validates the identification token by separating the authorization code, where delimited by ".", into three strings, where str1=Base64Encoded(JWS JOSE header), str2=Base64Encoded(JWT), and str3=Base64Encoded(JWS Signature). Each string can be decoded by computing client 106 using Base64 decoding, where Base64Decoded str1=JWS JOSE header, Base64Decoded str2=JWT, and Base64Decoded str3=JWS Signature. In some embodiments, where a signing certificate is stored locally by computing client 106, computing client 106 uses a signing certificate identified by the JOSE header SHA-256 thumbprint to validate the JWS signature using the JOSE header algorithm In the example embodiment, computing client 106 further validates the identification token by validating that the authentication request identifier in the identification token matches the authentication request identifier from the authentication request.

In the example embodiment, computing client 106 further validates the identification token by ensuring that an issuer identifier value associated with the secure authorization server 102 matches the value of an issuer identifier value in the identification token.

In another embodiment, computing client 106 validates that the identification token lists computing client 106 as a valid audience. Computing client 106 may reject the identification token if the identification token does not list computing client 106 as a valid audience, or if the identification token includes additional audiences not trusted by computing client 106. In still another embodiment, where the identification token includes multiple audiences, computing client 106 verifies that the authorized party is present. In a further embodiment, where an authorized party is listed in the identification token, computing client 106 further verifies that computing client 106 is the authorized party.

In some embodiments, if the identification token is received via direct communication between computing client 106 and token component 302, a TLS server validation may be used to validate an issuer of the identification token in place of verifying a token signature. Computing client 106 validates a token signature of all other identification tokens using the algorithm specified in the JWT algorithm header parameter. Computing client 106 uses keys provided by the identification token issuer.

In another embodiment, computing client 106 further verifies that a current time is before the expiration time on or after which the identification token cannot be accepted for processing. In an alternative embodiment, computing client 106 may reject an identification token issued too far away from the current time.

Token component 302 may encrypt the identification token using keys and algorithms that computing client 106 specified during registration with a provider of secure authorization server 102. If the identification token is encrypted by token component 302, computing client 106 may decrypt the identification token using the keys and algorithms specified during registration. If encryption was negotiated with the provider of secure authorization server 102 at registration time and the identification token received by computing client 106 is not encrypted, computing client 106 should reject the identification token.

The algorithm parameter of the JWS header in the identification token should be set to a default of ES256.

If computing client 106 requests that the authentication context class reference claim be included in the identification token, computing client 106 should verify that the authentication context class reference claim included in the identification token is appropriate.

The access token is credentials used to access protected resources, such as end-user 104 attributes, based upon what end-user 104 has authorized. In order to assure access token integrity when token component 302 issues the access token to computing client 106, the access token is implemented according to JSON Web token (JWT) and JSON Web Signature (JWS) standards, and the access token is signed by token component 302 and verified by computing client 106.

Figure 9:
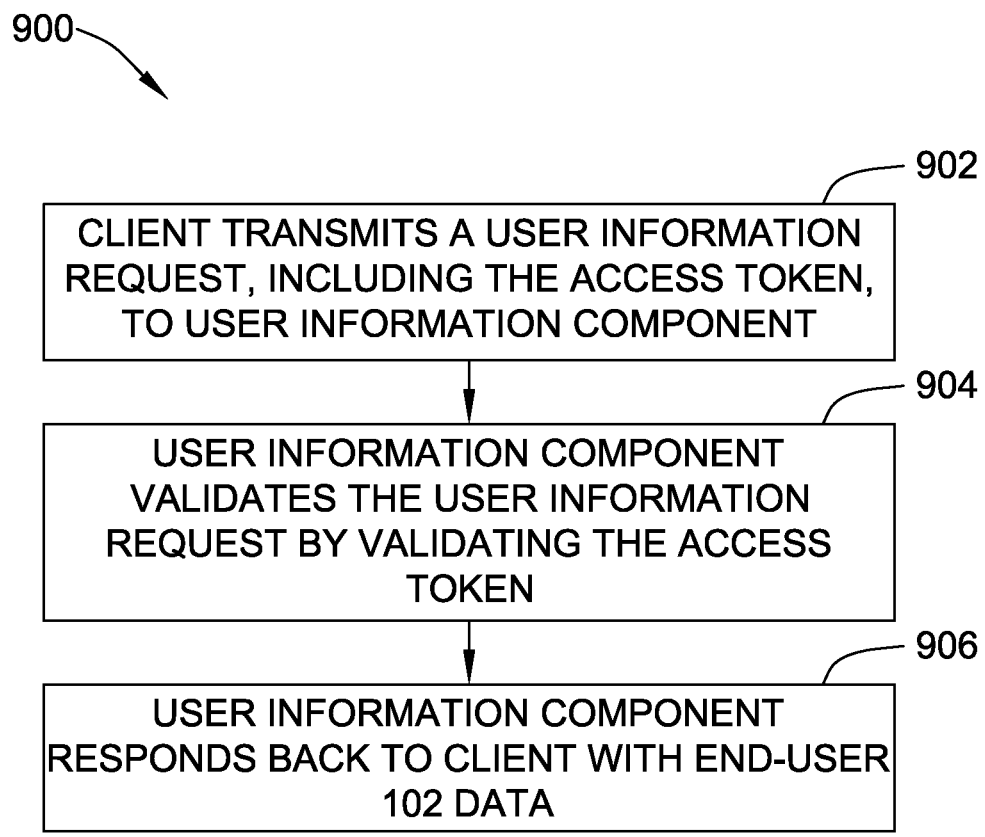

FIG. 9 is a flowchart of a method 900 for obtaining user attributes of end-user 104 in accordance with an embodiment of the disclosure. As shown in steps 902 through 906, user information component 402 validates a user information request from computing client 106 and transmits end-user 104 data in response.

As shown in 902, computing client 106 transmits a user information request, including the access token, to user information component 402. User information component 402 validates the user information request by validating the access token, as shown in 904.

As shown at 906, if the validation is successful, the user information component 402 transmits end-user 104 data to computing client 106. If the user information request validation is not successful, user information component 402 transmits an error response to computing client 106.

In order to assure end-user 104 data integrity when user information component 402 issues the end-user 104 data to computing client 106 in the user information response, the user information response is implemented according to JSON Web token (JWT) and JSON Web Signature (JWS) standards, where the JWT is signed by user information component 402 and verified by computing client 106.

In some embodiments, computing client 106 can transmit a refresh token received in the token response to user information component 402 to receive an access token. User information component 106 validates the refresh token and, if validation is successful, user information component 106 transmits an access token to computing client 106. Computing client 106 transmits a user information request, including the access token, to user information component 806, beginning again at 802.

In some embodiments, the authorization code is encrypted or obfuscated.

In some embodiments, computing client 106 is an OpenID Connect computing client and the secure authorization server 102 is operated by an OpenID identity provider.

In further embodiments, request and response messages transmitted between computing client 106 and all components of secure authorization server 102 are digitally signed by computing client 106 and the digital signature is validated by secure authorization server 102 to assure message integrity.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of-the claims.

What is claimed is:

1. A secure authorization server for verifying an identity of an end-user, said secure authorization server programmed to:
    receive, from a computing client, an authentication request at an authorization component, wherein the authentication request includes a secure authentication request identifier and a first redirection uniform resource indicator (URI);
    validate the authentication request at the authorization component by at least verifying that the secure authentication request identifier is valid;
    generate an authorization code, wherein the authorization code includes at least the secure authentication request identifier;
    transmit an authentication response from the authorization component to the computing client, wherein the authentication response includes the authorization code, wherein the authorization code represents a validation of the authentication request;
    receive, from the computing client, a token request at a token component, wherein the token request includes the authorization code and a second redirection uniform resource indicator (URI);
    validate the token request, at the token component, by matching the first redirection URI and the second redirection URI; and
    transmit a token response from the token component to the computing client, wherein the token response includes an identification token associated with an authenticated session, an access token, and a lifetime in seconds of the access token.

2. A secure authorization server in accordance with claim 1, wherein said secure authorization server is further programmed to:
    validate the token request, at the token component, by validating the authorization code.

3. A secure authorization server in accordance with claim 1, wherein said secure authorization server is further programmed to:
    receive, from the computing client, a user information request at a user information component, wherein the user information request includes the access token;
    validate the user information request, at the user information component, by validating the access token; and
    transmit end-user data from the user information component to the computing client in response to validating the user information request.

4. A secure authorization server in accordance with claim 1, wherein said secure authorization server is further programmed to transmit the identification token including at least the secure authentication request identifier from the authentication request, algorithm header parameters identifying an algorithm, and a digital certificate with a certificate thumbprint.

5. A secure authorization server in accordance with claim 1, wherein the identification token is encoded using Base64 encoding and formatted to enable the identification token to be parsed into three strings, wherein each string is configured to be decoded by the computing client during identification token validation.

6. A secure authorization server in accordance with claim 1, wherein the secure authentication request identifier is based upon at least a scope value, a response type, a computing client identifier, a redirection uniform resource indicator (URI) to which the authentication response will be sent, an opaque value, and a string value that associates a computing client session with an identification token.

7. A secure authorization server in accordance with claim 1, wherein said secure authorization server is further programmed to transmit the authentication response including at least the secure authentication request identifier from the authentication request, algorithm header parameters identifying an algorithm, and a digital certificate with a certificate thumbprint.

8. A secure authorization server in accordance with claim 1, wherein the authorization code is encoded using Base64 encoding and formatted to enable the authorization code to be parsed into three strings, wherein each string is configured to be decoded by the computing client during authorization code validation.

9. A method for verifying an identity of an end-user, said method implemented using a secure authorization computing device including at least one processor in communication with a memory, the secure authorization computing device in communication with a computing client, said method comprising:
    receiving, from the computing client, an authentication request at an authorization component, wherein the authentication request includes a secure authentication request identifier and a first redirection uniform resource indicator (URI);
    validating the authentication request at the authorization component by at least verifying that the secure authentication request identifier is valid;

generating an authorization code, wherein the authorization code includes at least the secure authentication request identifier;

transmitting an authentication response from the authorization component to the computing client, wherein the authentication response includes the authorization code, wherein the authorization code represents a validation of the authentication request;

receiving, from the computing client, a token request at a token component, wherein the token request includes the authorization code and a second redirection uniform resource indicator (URI);

validating the token request, at the token component, by matching the first redirection URI and the second redirection URI; and transmitting a token response from the token component to the computing client, wherein the token response includes an identification token associated with an authenticated session, an access token, and a lifetime in seconds of the access token.

10. The method in accordance with claim 9, wherein the secure authorization computing device further includes an authorization component and a token component, said method further comprising:

validating the token request, at the token component, by validating the authorization code.

11. The method in accordance with claim 9, wherein transmitting a token response further comprises transmitting the token response with the identification token, the identification token including at least the secure authentication request identifier from the authentication request, algorithm header parameters identifying an algorithm, and a digital certificate with a certificate thumbprint.

12. The method in accordance with claim 9 further comprising encoding the identification token using Base64 encoding, and formatting the identification token such that the identification token can be parsed into three strings, wherein each string can be decoded by the computing client during identification token validation.

13. The method in accordance with Claim 9, wherein the secure authorization computing device further includes an authorization component, a token component, and a user information component, said method further comprising:

receiving, from the computing client, a user information request at the user information component, wherein the user information request includes the access token;

validating the user information request, at the user information component, by validating the access token; and transmitting end-user data from the user information component to the computing client in response to validating the user information request.

14. The method in accordance with claim 9, wherein the secure authentication request identifier is based upon at least a scope value, a response type, a computing client identifier, a redirection uniform resource indicator (URI) to which the authentication response will be sent, an opaque value, and a string value that associates a computing client session with an identification token.

15. The method in accordance with claim 9, wherein transmitting an authentication response further comprises transmitting the authentication response with the authorization code, wherein the authorization code includes at least the secure authentication request identifier from the authentication request, algorithm header parameters identifying an algorithm, and a digital certificate with a certificate thumbprint.

16. The method in accordance with claim 9 further comprising encoding the authorization code using Base64 encoding, and formatting the authorization code such that the authorization code can be parsed into three strings, wherein each string can be decoded by the computing client during authorization code validation.

17. A non-transitory computer-readable storage media having computer-executable instructions embodied thereon for verifying an identity of an end-user, wherein when executed by at least one processor, the computer-executable instructions cause the processor to:

receive, from a computing client, an authentication request at an authorization component, wherein the authentication request includes a secure authentication request identifier and a first redirection uniform resource indicator (URI);

validate the authentication request at the authorization component by at least verifying that the secure authentication request identifier is valid;

generate an authorization code, wherein the authorization code includes at least the secure authentication request identifier;

transmit an authentication response from the authorization component to the computing client, wherein the authentication response includes the authorization code, wherein the authorization code represents a validation of the authentication request;

receive, from the computing client, a token request at a token component, wherein the token request includes the authorization code and a second redirection uniform resource indicator (URI);

validate the token request, at the token component, by matching the first redirection URI and the second redirection URI; and transmit a token response from the token component to the computing client, wherein the token response includes an identification token associated with an authenticated session, an access token, and a lifetime in seconds of the access token.

18. The non-transitory computer-readable storage media of claim 17, wherein the computer-executable instructions further cause the processor to:

validate the token request, at the token component, by validating the authorization code.

19. The non-transitory computer-readable storage media of claim 17, wherein the computer-executable instructions further cause the processor to:

receive, from the computing client, a user information request at a user information component, wherein the user information request includes the access token;

validate the user information request, at the user information component, by validating the access token; and transmit end-user data from the user information component to the computing client in response to validating the user information request.

20. The non-transitory computer-readable storage media of claim 17, wherein a secure authorization server is further programmed to transmit the identification token including at least the secure authentication request identifier from the authentication request, algorithm header parameters identifying an algorithm, and a digital certificate with a certificate thumbprint.

21. The non-transitory computer-readable storage media of claim 17, wherein the secure authentication request identifier is based upon at least a scope value, a computing client identifier, a redirection uniform resource indicator (URI) to which the authentication response will be sent, an opaque value, and a string value that associates a computing client session with an identification token.

* * * * *